US010764037B2

(12) United States Patent
Yan

(10) Patent No.: US 10,764,037 B2
(45) Date of Patent: Sep. 1, 2020

(54) METHOD AND APPARATUS FOR DUPLICATED DATA MANAGEMENT IN CLOUD COMPUTING

(71) Applicant: Nokia Technologies Oy, Espoo (FI)

(72) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 291 days.

(21) Appl. No.: 15/536,986

(22) PCT Filed: Dec. 23, 2014

(86) PCT No.: PCT/CN2014/094682
§ 371 (c)(1),
(2) Date: Jun. 16, 2017

(87) PCT Pub. No.: WO2016/101153
PCT Pub. Date: Jun. 30, 2016

(65) Prior Publication Data
US 2017/0346625 A1    Nov. 30, 2017

(51) Int. Cl.
*H04L 29/06* (2006.01)
*H04L 9/08* (2006.01)
(Continued)

(52) U.S. Cl.
CPC ........ *H04L 9/0825* (2013.01); *G06F 11/1453* (2013.01); *G06F 16/1756* (2019.01);
(Continued)

(58) Field of Classification Search
CPC ... H04L 9/0825; H04L 9/0847; G06F 21/602; G06F 21/6209
See application file for complete search history.

(56) References Cited

U.S. PATENT DOCUMENTS 7,567,188 B1 *  7/2009  Anglin ................. G06F 3/0608
                                                   341/63
7,814,149 B1 * 10/2010  Stringham .......... G06F 16/1748
                                                   709/203
(Continued)

FOREIGN PATENT DOCUMENTS

CN    102915278 A    2/2013
CN    103618728 A    3/2014
(Continued)

OTHER PUBLICATIONS

Cramption, Jason; Pinto, Alexandre; Attribute-based Encryption for Access Control Using Elementary Operations; 2014 IEEE 27th Computer Security Foundations Symposium; IEEE Computer Society. 2014. (Year: 2014).*

(Continued)

*Primary Examiner* — Chau Le
*Assistant Examiner* — Vance M Little
(74) *Attorney, Agent, or Firm* — Mintz Levin Cohn Ferris Glovsky and Popeo, P.C.

(57) ABSTRACT

An approach is provided for managing data duplication in cloud computing. A method comprising, sending from a first device to a data center, data encrypted with a data encryption key for storing the encrypted data at the data center; encrypting the data encryption key according to an attribute-based encryption (ABE) scheme by using identity as an attribute in a deduplication policy for the data; issuing to a second device, a personalized secret attribute key which is derived from a public key of the second device according to the attribute-based encryption (ABE) scheme, wherein the personalized secret attribute key is to be used for decrypting the encrypted data encryption key at the second device, in combination with the policy.

9 Claims, 7 Drawing Sheets

(51) Int. Cl.
G06F 16/174 (2019.01)
G06F 21/60 (2013.01)
G06F 21/62 (2013.01)
G06F 11/14 (2006.01)

(52) U.S. Cl.
CPC ........ *G06F 21/602* (2013.01); *G06F 21/6209* (2013.01); *H04L 9/088* (2013.01); *H04L 9/0847* (2013.01); *H04L 9/0894* (2013.01)

(56) References Cited

U.S. PATENT DOCUMENTS

| | | | |
|---|---|---|---|
| 8,281,143 B1 | 10/2012 | Clifford et al. | |
| 9,076,004 B1* | 7/2015 | Bogorad | G06F 21/602 |
| 9,202,076 B1* | 12/2015 | Chazin | G06F 21/6218 |
| 9,367,559 B1* | 6/2016 | Zhang | G06F 11/1451 |
| 9,390,101 B1* | 7/2016 | Schneider | G06F 16/1748 |
| 2008/0059787 A1* | 3/2008 | Hohenberger | H04L 9/3013 |
| | | | 713/153 |
| 2008/0104393 A1* | 5/2008 | Glasser | G06F 21/6218 |
| | | | 713/165 |
| 2010/0058013 A1 | 3/2010 | Gelson et al. | |
| 2011/0161680 A1 | 6/2011 | Grube et al. | |
| 2012/0159175 A1 | 6/2012 | Yocom-Piatt et al. | |
| 2012/0260094 A1* | 10/2012 | Asim | G06F 21/10 |
| | | | 713/171 |
| 2012/0300936 A1 | 11/2012 | Green | |
| 2013/0024424 A1* | 1/2013 | Prahlad | G06F 3/0649 |
| | | | 707/640 |
| 2013/0151759 A1* | 6/2013 | Shim | G06F 12/0246 |
| | | | 711/103 |
| 2013/0305039 A1 | 11/2013 | Gauda | |
| 2014/0006465 A1* | 1/2014 | Davis | G06F 16/182 |
| | | | 707/827 |
| 2014/0052985 A1 | 2/2014 | Yang | |
| 2014/0108332 A1* | 4/2014 | Haze | G06F 9/44505 |
| | | | 707/609 |
| 2014/0143548 A1* | 5/2014 | Wang | H04L 9/0897 |
| | | | 713/171 |
| 2014/0189348 A1 | 7/2014 | El-Shimi et al. | |
| 2014/0229440 A1* | 8/2014 | Venkatesh | G06F 3/061 |
| | | | 707/634 |
| 2015/0066873 A1* | 3/2015 | Voruganti | G06F 16/1748 |
| | | | 707/692 |
| 2015/0222605 A1* | 8/2015 | Ignatenko | H04L 9/088 |
| | | | 713/168 |
| 2016/0065540 A1* | 3/2016 | Androulaki | G06F 16/00 |
| | | | 713/171 |

FOREIGN PATENT DOCUMENTS

| | | |
|---|---|---|
| CN | 103731423 A | 4/2014 |
| CN | 104023027 A | 9/2014 |
| WO | 2014/043894 A1 | 3/2014 |
| WO | 2014/063361 A1 | 5/2014 |

OTHER PUBLICATIONS

International Search Report and Written Opinion received for corresponding Patent Cooperation Treaty Application No. PCT/CN2014/094682, dated Sep. 23, 2015, 11 pages.
Extended European Search Report received for corresponding European Patent Application No. 14908723.1, dated Sep. 6, 2018, 12 pages.
Chow et al., "Controlling Data in the Cloud: Outsourcing Computation without Outsourcing Control", Proceedings of the 2009 ACM workshop on Cloud computing security, Nov. 13, 2009, pp. 85-90.
Kamara et al., "Cryptographic Cloud Storage", International Conference on Financial Cryptography and Data Security, 2010, pp. 1-14.
Liu et al., "Efficient Information Retrieval for Ranked Queries in Cost-Effective Cloud Environments", IEEE International Conference on Computer Communications: Mini-Conference, Mar. 25-30, 2012, pp. 2581-2585.
Kallahalla et al., "Plutus: Scalable Secure File Sharing on Untrusted Storage", 2nd USENIX Conference on File and Storage Technologies, Mar. 31-Apr. 2, 2003, pp. 29-42.
Goh et al., "SiRiUS: Securing Remote Untrusted Storage", In proceedings of the Internet Society (ISOC) Network and Distributed Systems Security (NDSS) Symposium, vol. 3, 2003, 15 pages.
Bethencourt et al., "Ciphertext-Policy Attribute-Based Encryption", IEEE Symposium on Security and Privacy, May 20-23, 2007, 15 pages.
Goyal et al., "Attribute-Based Encryption for Fine-Grained Access Control of Encrypted Data", Proceedings of the 13th ACM conference on Computer and communications security, Oct. 30-Nov. 3, 2006, pp. 89-98.
Muller et al., "Distributed Attribute-Based Encryption", 11th International Conference Information Security and Cryptology—ICISC 2008, pp. 20-36.
Sahai et al., "Fuzzy Identity-Based Encryption", Proceedings of the 24th annual international conference on Theory and Applications of Cryptographic Techniques, 2005, pp. 457-473.
Yu et al., "Achieving Secure, Scalable, and Fine-grained Data Access Control in Cloud Computing", Proceedings IEEE INFOCOM, Mar. 14-19, 2010, 9 pages.
Wang et al., "Hierarchical Attribute-Based Encryption and Scalable User Revocation for Sharing Data in Cloud Servers", Computers & Security, vol. 30, No. 5, Jul. 2011, pp. 320-331.
Yu et al., "Attribute Based Data Sharing With Attribute Revocation", Proceedings of the 5th ACM Symposium on Information, Computer and Communications Security, Apr. 13-16, 2010, pp. 261-270.
Wang et al., "Hierarchical Attribute-Based Encryption for Fine-Grained Access Control in Cloud Storage Services", Proceedings of the 17th ACM conference on Computer and communications security, Oct. 4-8, 2010, pp. 735-737.
Zhou et al., "Piracy-Preserved Access Control for Cloud Computing", International Conference on rust, Security and Privacy in Computing and Communications (TrustCom), 2011, pp. 83-90.
Wan et al., "HASBE: A Hierarchical Attribute-Based Solution for Flexible and Scalable Access Control in Cloud Computing", IEEE Transactions on Information Forensics and Security, vol. 7, No. 2, Apr. 2012, 12 pages.
Tang et al., "Secure Overlay Cloud Storage with Access Control and Assured Deletion", IEEE Transactions on Dependable and Secure Computing (TDSC), vol. 9, No. 6, Nov.-Dec. 2012, pp. 1-14.
Bellare et al., "DupLESS: Server-Aided Encryption for Deduplicated Storage", 22nd USENIX Security Symposium, Aug. 14-16, 2013, pp. 179-194.
"Dropbox, a File-Storage and Sharing Service", Dropbox, Retrieved on May 30, 2017, Webpage available at : https://www.dropbox.com/?landing=dbv2.
"Google Drive—Cloud Storage & File Backup for Photos, Docs & More", Google, Retrieved on Jul. 5, 2018, Webpage available at : https://www.google.com/intl/en/drive/#start.
"Mozy, a File-Storage and Sharing Service", Mozy, Retrieved on Jul. 5, 2018, Webpage available at : https://mozy.com/#slide-11.
Douceur et al., "Reclaiming Space from Duplicate Files in a Serverless Distributed File System", 22nd International Conference on Distributed Computing Systems, Jul. 2-5, 2002, 8 pages.
Wallace et al., "Characteristics of Backup Workloads in Production Systems", Proceedings of the 10th USENIX conference on File and Storage Technologies (FAST), Feb. 14-17, 2012, 16 pages.
Kaaniche et al., "A Secure Client Side Deduplication Scheme in Cloud Storage Environments", 6th International Conference on New Technologies, Mobility and Security (NTMS), Mar. 30-Apr. 2, 2014, 7 pages.
Sathana et al., "Three Level Security System for Dynamic Group in Cloud", International Journal of Computer Science Trends and Technology (IJCST), vol. 1, No. 2, Nov.-Dec. 2013, pp. 23-28.
Yang et al., "Provable Ownership of Encrypted Files in De-Duplication Cloud Storage", Adhoc & Sensor Wireless Networks, 2015, vol. 26, No. 1-4, 2015, pp. 1-13.

(56) References Cited

OTHER PUBLICATIONS

Puzio et al., "ClouDedup: Secure Deduplication with Encrypted Data for Cloud Storage", IEEE International Conference on Cloud Computing Technology and Science, Dec. 2-5, 2013, 8 pages.
Partial Supplementary European Search Report received for corresponding European Patent Application No. 14908723.1, dated Jun. 21, 2018, 11 pages.

* cited by examiner

METHOD AND APPARATUS FOR DUPLICATED DATA MANAGEMENT IN CLOUD COMPUTING

RELATED APPLICATION

This application was originally filed as Patent Cooperation Treaty Application No. PCT/CN2014/094682 filed Dec. 23, 2014.

FIELD OF THE INVENTION

The present invention generally relates to information security and storage. More specifically, the invention relates to securely and effectively managing a storage and access for duplicated data in cloud computing.

BACKGROUND

Cloud computing offers a new way of Information Technology (IT) services by re-arranging various resources (e.g., storage, computing and services) and providing them to users based on user's demands. Cloud computing provides a big resource pool by linking network resources together. It has desirable properties, such as scalability, elasticity, fault-tolerance, and pay-per-use. Thus, it becomes a promising service platform, rearranging the structure of IT.

One of the most important and typical cloud services is data storage. In the cloud computing, various cloud service providers (CSPs) provide huge volumes of storage to help users to save their data, such as, photos, contacts, emails, etc. But duplicated data may be stored at the cloud by a same user or different users, especially for shared data. Although the cloud storage space is huge, this kind of duplication could greatly waste networking resources, consume a lot of power energy, increase operation cost, or make data management complicated.

Thus, it would be an advancement to provide methods and systems that allow for store duplicated data at cloud with proper access control so as to ensure data security and privacy and at the same time save storage spaces.

SOME EXAMPLE EMBODIMENTS

To overcome limitations in the prior art described above, and to overcome other limitations that will be apparent upon reading and understanding the present specification, the disclosure provides an approach for securely and effectively managing a storage and access for duplicated data in cloud computing.

According to one embodiment, a method comprises sending from a first device to a data center, data encrypted with a data encryption key for storing the encrypted data at the data center; encrypting the data encryption key according to an attribute-based encryption (ABE) scheme by using an identity as an attribute in a deduplication policy for the data; issuing to a second device, a personalized secret attribute key which is derived from a public key of the second device according to the attribute-based encryption (ABE) scheme. The personalized secret attribute key is to be used for decrypting the encrypted data encryption key at the second device, in combination with the policy. The data center may be offered by a cloud computing service provider.

In an exemplary embodiment, the method can further comprise receiving a deduplication notification from the data center, indicating that a duplication of the same data from the second device is requested to be stored or has been stored at the data center, wherein the personalized secret attribute key is derived and issued in response to the receipt of the deduplication notification. The method can further comprise informing the data center to deduplicate the same data from the second device.

In an exemplary embodiment, the method can further comprise: sending the encrypted data encryption key to the data center or the second device. In an exemplary embodiment, the method can further comprise: setting the policy for the data and sending the policy to the data center.

In an exemplary embodiment, the method can further comprise: issuing to a third device, a personalized secret attribute key which is derived from a public key of the third device according to the attribute-based encryption (ABE) scheme, wherein the personalized secret attribute key issued to the third device is to be used for decrypting the encrypted data encryption key at the third device, in combination with the policy.

In an exemplary embodiment, the method can further comprise: sending to the data center, a request for deleting the data from the data center; and continuing a control of an encryption of the data encryption key and the issue of personalized secret attribute keys for decrypting the encrypted data encryption key.

In an exemplary embodiment, the method can further comprise: sending to the data center a request for storing the data; and receiving from the data center an indication that there is no same data stored at the data center. The data encrypted with the data encryption key can be sent to the data center in response to the receipt of the indication.

According to another embodiment, a method comprises receiving from a first device at a data center, a request for storing data at the data center; checking whether there is same data already stored at the data center; in response to a check result that there is no same data stored at the data center, storing the data encrypted with a data encryption key at the data center; in response to a check result that there is same data already stored at the data center, notifying an owner of the data for deduplication. The data center can be offered by a cloud computing service provider.

In an exemplary embodiment, the method can further comprise: checking whether a user of the first device is the owner of the data; and storing the data encrypted with a data encryption key by the owner at the data center, in response to a check result that the user of the first device is the owner of the data.

In an exemplary embodiment, the method can further comprise: in response to a check result that there is same data already stored at the data center and the user of the first device is the owner of the data, discarding the same data already stored at the data center.

In an exemplary embodiment, the method can further comprise: in response to a check result that there is same data already stored at the data center and the user of the first device is not the owner of the data, discarding a storage of the data from the first device and creating a record of the storage of the data for the first device.

In an exemplary embodiment, the method can further comprise: receiving from a second device, a request for deleting data stored at the data center; removing a record of the storage of the data for the second device; and removing the data in an instance in which there is no record on the storage of the data left after the remove of the record.

In an exemplary embodiment, the method can further comprise: in an instance in which the second device is the owner of the data, requesting the second device to continue control the deduplication or requesting another user of the data to take a control of the deduplication when the second device user removes its data storage at the data center.

In an exemplary embodiment, the method can further comprise: receiving the data encryption key that is encrypted according to an attribute-based encryption (ABE) scheme by using identity as an attribute in a deduplication policy for the data.

According to another embodiment, an apparatus comprising at least one processor, and at least one memory including computer program code, the at least one memory and the computer program code configured to, with the at least one processor, cause, at least in part, the apparatus to send to a data center, data encrypted with a data encryption key for storing the encrypted data at the data center; encrypt the data encryption key according to an attribute-based encryption (ABE) scheme by using identity as an attribute in a deduplication policy for the data; and issue to a device, a personalized secret attribute key that is derived from a public key of the device according to the attribute-based encryption (ABE) scheme. The personalized secret attribute key is to be used for decrypting the encrypted data encryption key at the device, in combination with the policy.

According to another embodiment, an apparatus comprising at least one processor, and at least one memory including computer program code, the at least one memory and the computer program code configured to, with the at least one processor, cause, at least in part, the apparatus to receive from a first device, a request for storing data at a data center; checking whether there is same data already stored at the data center; in response to a check result that there is no same data stored at the data center, store the data encrypted with a data encryption key at the data center; and in response to a check result that there is same data already stored at the data center, notify an owner of the data for deduplication.

According to another embodiment, a computer-readable storage medium carrying one or more sequences of one or more instructions which, when executed by one or more processors, cause, at least in part, an apparatus to send to a data center, data encrypted with a data encryption key for storing the encrypted data at the data center; encrypt the data encryption key according to an attribute-based encryption (ABE) scheme by using an identity of the apparatus as an attribute in a deduplication policy for the data; and issue to a device, a personalized secret attribute key which is derived from a public key of the device according to the attribute-based encryption (ABE) scheme. The personalized secret attribute key is to be used for decrypting the encrypted data encryption key at the device, in combination with the policy.

According to another embodiment, a computer-readable storage medium carrying one or more sequences of one or more instructions which, when executed by one or more processors, cause, at least in part, an apparatus to receive from a first device, a request for storing data at a data center; checking whether there is same data already stored at the data center; in response to a check result that there is no same data stored at the data center, store the data encrypted with a data encryption key at the data center; and in response to a check result that there is same data already stored at the data center, notify an owner of the data for deduplication.

According to another embodiment, an apparatus comprises means for sending from a first device to a data center, data encrypted with a data encryption key for storing the encrypted data at the data center; means for encrypting the data encryption key according to an attribute-based encryption (ABE) scheme by using an identity of the first device as an attributes in a policy for the data; and means for issuing to a second device, a personalized secret attribute key that is derived from a public key of the second device according to the attribute-based encryption (ABE) scheme. The personalized secret attribute key is to be used for decrypting the encrypted data encryption key at the second device, in combination with the policy.

According to another embodiment, an apparatus comprises means for receiving from a first device at a data center, a request for storing data at the data center; means for checking whether there is same data already stored at the data center; means for in response to a check result that there is no same data stored at the data center, storing the data encrypted with a data encryption key at the data center; and means for in response to a check result that there is same data already stored at the data center, notifying an owner of the data for deduplication.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
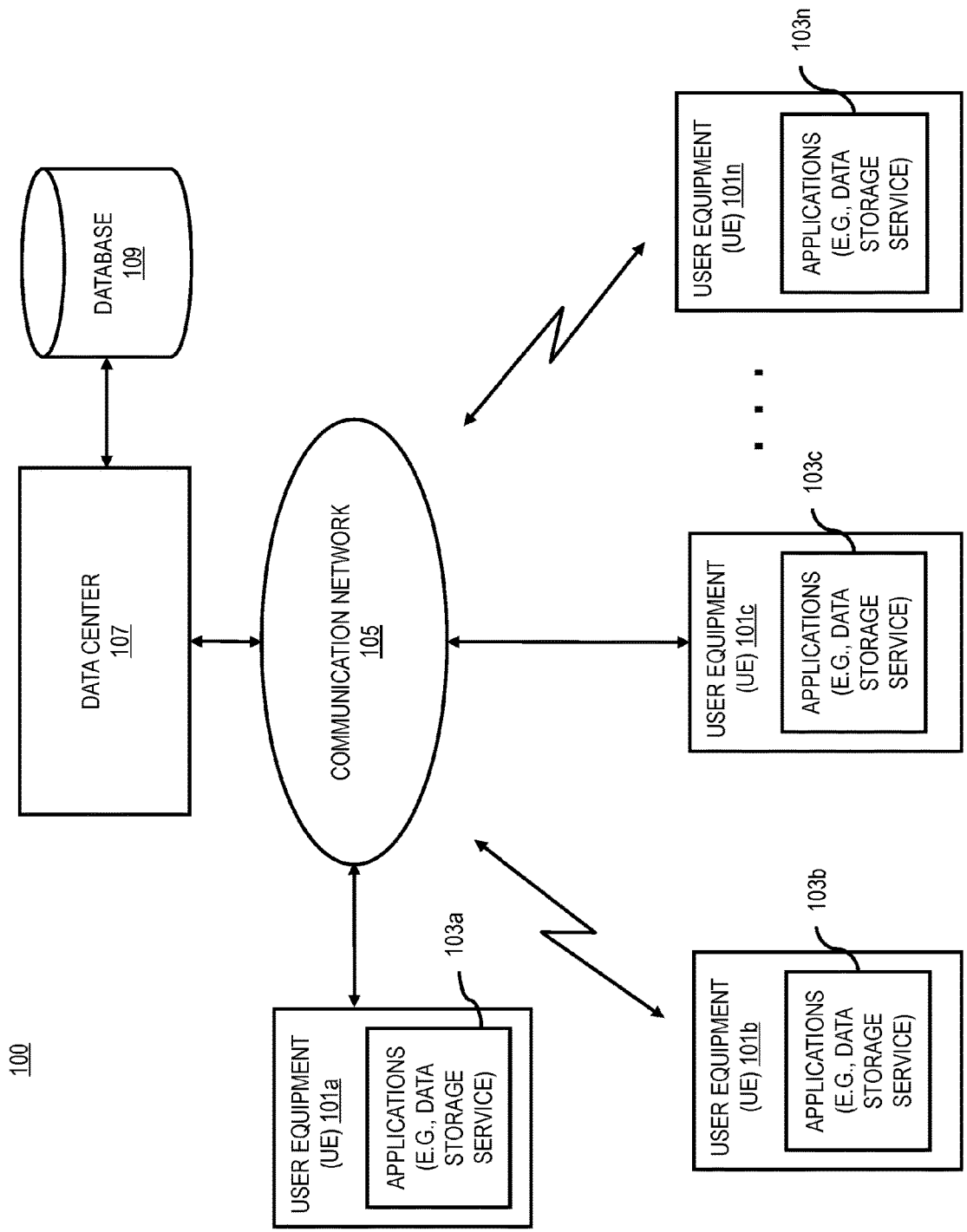
FIG. 1 is a diagram of a system capable of providing a storage and access for duplicated data in cloud computing according to an embodiment.

Examples of a method, apparatus, and computer program for securely and effectively managing a storage and access for duplicated data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in a block diagram form in order to avoid unnecessarily obscuring the embodiments of the invention.

As mentioned above, in the context of cloud computing, the same data could be saved at the cloud for multiple times by a same user or different users. For example, a document of one user (such as an owner of the document) is saved at a cloud of a CSP, and this document may be shared or downloaded by another user who may also save the same document at the cloud under his own account. Meanwhile, the owner may also save the data at different time (e.g. due to lack of memory). As such, duplicated data of the document are stored at the cloud. Duplicated data storage greatly wastes storage resources, unnecessarily consumes power energy, increases operation cost of CSPs, and complicates data management at the cloud (e.g., searching data could become complicated). Thus, it will be advantage to deduplicate data according to embodiments of the present invention. However, in case that a backup of stored data is applied by a CSP for reducing storage risk, this kind of duplication handled by a CSP is not in the scope of the present invention and thus a duplication of backup data may not be processed for deduplication.

On the other hand, in the context of cloud computing, personal data should be well protected at the CSP. Although data owners may upload personal data to a CSP and allow it to maintain these data, the CSP may not be fully trusted by the data owner. Further, it is highly expected that access control for personal data can be performed by a CSP based on expectations of the data owner. As such, the data owner may encrypt its crucial data and save encrypted data (i.e. ciphertext) at the cloud. Then, duplicated data under different encryption schemes could be saved at the cloud, which has the same problem as described above. In addition, a data owner would like to control not only data access, but also data storage and usage by other data holders (e.g. as a part of digital rights management). As such, it is highly expected that the data deduplication according to embodiments of the present invention can cooperate well with other data access control mechanisms, from the flexibility point of view. That is, the same data (in a encryption status) is only saved once at the cloud, but can be accessed by different users based on respective access policies.

In the cloud computing, data owners upload personal data to a cloud service provider (CSP) and allow it to maintain these data. Rather than fully trusting the CSP, existing researches proposed to only outsource encrypted data to the cloud in order to ensure the data privacy.

Access control on encrypted data means that the encrypted data can only be decrypted by authorized entities with permissions. An ideal approach is to encrypt each data once, and distribute appropriate keys to the authorized entities once, so that each entity can only decrypt its authorized data. However, due to the dynamic characteristic of trust and the change of trust relationships in different contexts, the encryption and decryption keys should be frequently updated in order to achieve expected security level.

To ensure data security in a distrusted or semi-trusted party (e.g., a CSP), a traditional symmetric key cryptographic system can be adopted to encrypt data. Before outsourcing, the data owner first classifies data with similar access control lists (ACLs) into a file-group, and then encrypts each file-group with a symmetric key. The symmetric key will be distributed to the users in the ACL, so that only the users in the ACL can access this group of files. The main drawback of this approach is that the number of keys managed by the data owner grows linearly with the number of file-groups. The trust relationship change between one user and the data owner could cause an essential update of the related symmetric key and influence other users in the same ACL. Thus, this solution is impractical in many real application scenarios.

Another approach for ensuring data security is based on the combination of traditional symmetric key and public key cryptographic systems. A data owner first specifies an ACL for its data, and then encrypts the data with a symmetric key, which is encrypted with public keys of users in the ACL. Therefore, only the users in the ACL can recover the data using their private keys. The main drawback of this approach is that the costs for encrypting data will grow linearly with the number of users in the ACL.

ABE (Attribute-Based Encryption) is a promising cryptographic technique and an attractive choice when selecting an encryption scheme for cloud computing. In an ABE system, users are identified by a set of attributes rather than an exact identity. Each data is encrypted with an attribute-based access structure, such that only the users whose attributes satisfy the access structure can decrypt the data. ABE has developed into two branches, key-policy ABE (KP-ABE) and ciphertext-policy ABE (CP-ABE), depending on how attributes and policy are associated with ciphertexts and users' decryption keys. In CP-ABE, ciphertexts are encrypted according to an access control policy, formulated as a Boolean formula over the attributes. The construction assures that only a user whose attributes satisfy the access control policy is able to decrypt the ciphertext with its personalized secret attribute key. In KP-ABE, a user's secret key is associated with a set of attributes.

Recently ABE is widely applied in secure data storage for cloud computing, in order to achieve flexibility in terms of attributes, scalability and fine-grained access control. However, existing approaches for access control on encrypted data didn't consider how to solve duplicate data storage issue in cloud computing, especially for encrypted data.

Reconciling deduplication and client-side encryption is an active research topic. Cloud storage service providers such as Dropbox, Google Drive, Mozy, and the like, perform deduplication to save space by only storing one copy of each file uploaded. The savings, which can be passed back directly or indirectly to customers, are significant and central to the economics of the business. Should clients conventionally encrypt their data, however, savings are lost. This is because that existing industrial solutions fail in encrypted data deduplication.

Message-locked encryption (MLE) (the most prominent manifestation of which is convergent encryption) is proposed to resolve this tension. However it is inherently subject to brute-force attacks that can recover data falling into a known set. Its most prominent instantiation is convergent encryption (CE). CE is used within a wide variety of commercial and research Storage Service systems. Letting M be a file's contents, hereafter called the message, the client first computes a key $K \leftarrow H(M)$ by applying a cryptographic hash function H to the message, and then computes the ciphertext $C \leftarrow E(K,M)$ via a deterministic symmetric encryption scheme. The short message-derived key K is stored separately encrypted under a per-client key or password. A second client B encrypting the same file M will produce the same C, enabling deduplication.

However, CE is subject to an inherent security limitation, namely susceptibility to offline brute-force dictionary attacks. Knowing that the target message M underlying a target ciphertext C is drawn from a dictionary $S=\{M1, \ldots, Mn\}$ of size n, the attacker can recover M in the time for $n=|S|$ off-line encryptions: for each $i=1, \ldots, n$, it simply CE-encrypts Mi to get a ciphertext denoted Ci and returns the Mi such that C=Ci. (This works because CE is deterministic and keyless.) Security is thus only possible when the target message is drawn from a space too large to exhaust. Such a message is unpredictable. Another problem of this scheme is that it is not flexible to support access control of data by the data owner and holders, especially for data revocation process, since it is hard to make the data owner and holders to get the same new key that is used for data re-encryption.

Another approach proposes an architecture that provides secure deduplicated storage resisting brute-force attacks, and realizes it in a system called DupLESS. In DupLESS, clients encrypt under message-based keys obtained from a key-server via an oblivious PRF (pseudo random function) protocol. It enables clients to store encrypted data with an existing service, have the service perform deduplication on their behalf, and yet achieves strong confidentiality guarantees. Concretely in DupLESS, a group of affiliated clients (e.g., company employees) encrypt their data with the aid of a key server (KS) that is separate from the Storage Service (SS). Clients authenticate themselves to the KS, but do not leak any information about their data to it. As long as the KS remains inaccessible to attackers, we ensure high security. If both the KS and SS are compromised, the current MLE guarantee of security for unpredictable messages is retained.

However, some data owners don't like to use a third party to control its data storage since in many situations they would like to control data storage and access by themselves and track their own data's location and usage status. The above solutions cannot support data access control on other data users by both data owner and data holder in a flexible way. They cannot support digital rights management either.

Embodiments of this disclosure proposes a scheme to deduplicate data stored at CSP, by applying attribute-based encryption (ABE) to manage the keys used for duplicated data storage of different authorized data users, including data owner and eligible data holders. According to the ABE mechanism, identifiers (such as ID) of these authorized users are treated as a valid attribute for accessing encrypted data stored at CSP. Such scheme can be applied into various scenarios that the data owner would like to control data storage and access by itself and track its own data location and usage status.

In various embodiments, data can be uniquely identified among CSPs and users involved in management, storage and access of the data. For example, a hash code of data M can be used as an indicator of the data M, for checking the duplication of the data M during data uploading and storage. The hash code of the data M can be further signed by the data owner or data holder for the originality verification performed by the CSP.

As discussed above, in order to ensure the security and privacy of data, data owner or holders would encrypt their data and then outsource the encrypted data the cloud. In an embodiment, a data owner can encrypt the data using a randomly selected symmetric key DEK, and then store the encrypted data at a CSP together with a signed hash code of the data. According to various embodiments, the data owner further encrypts the DEK with an ABE mechanism, by using identity as an attribute. Then, the encrypted DEK can be also passed to the CSP.

When a data duplication occurs, it may be checked by the CSP through a hash code comparison. The CSP may contact the data owner for deduplication of the same data from an uploader. Then, the data owner issues a personalized secret key for decrypting the encrypted DEK to the uploader (i.e., a data holder). For example, the personalized secret key may be sent to the uploader through the CSP or directly, e.g. by using Public Key Cryptosystem (PKC). Before the issue of the personalized secret key, verification for eligibility of the uploader may be performed by the CSP to check whether the uploader is allowed to store data at the CSP. Additionally or alternatively, the verification may be performed by the data owner to check whether the uploader is allowed to access encrypted data which is stored at the CSP by the owner. When the eligibility verification is positive, the personalized secret key would be issued to the uploader. When another eligible data holder stores the same data at the CSP, the data owner can issue to the new data holder, another personalized decryption key which is different from that issued to the other uploader.

With respective personalized decryption key, each uploader is capable of decrypt the encrypted DEK under its policy, according to the ABE mechanism. Then, the respective decrypted key DEK can be used to decrypt the encrypted data stored at the cloud. In this regard, KP-ABE and CP-ABE can be applied in implementation.

In case that a real data owner uploads the data later than a data holder, the CSP can manage to save the encrypted data of the real data owner at the cloud, and allow the data owner to manage and issue corresponding access keys to other data holders.

When a data holder deletes data from a CSP, the CSP firstly manages the duplicated data holders' records by removing the duplication record of this user. If the rest records are not empty, the CSP will not delete the stored data, but block the data access from the holder that requests data deletion. In some embodiments, the CSP may further inform the data owner to allow it to decide whether a re-encryption of the raw data is needed. When the re-encryption is needed, the data owner may select a new DEK' and then issue an updated encrypted DEK' (with a ABE mechanism) to existing eligible data holders. The newly encrypted raw data is uploaded and stored at the CSP by replacing the old encrypted data. In case that a real data owner wants to delete the data from a CSP, the CSP can request the data owner to process deduplication continuously, or transfer this task to the next earliest data uploader as a deduplication delegate with the permission of the data owner.

In some embodiments, a CSP could treat an uploader who uploads the data first as the owner of underlying data, unless an uploader can provide a valid proof to show that it is the real data owner.

Various embodiments can be applied into a distributed storage system, such as a cloud computing system shown in FIG. 1. the system 100 comprises user equipment (UE) 101 having connectivity to a data center 107, other UEs 101 and other communication entities (such as a third party or any other CSP user, not shown) via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), a self-organized mobile network, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), wireless local area network (WLAN), Long Term Evolution (LTE) networks, code division multiple access (CDMA), wideband code division multiple access (WCDMA), wireless fidelity (WiFi), satellite, mobile ad-hoc network (MANET), and the like.

The UE 101 can be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). As shown in FIG. 1, user equipment (UEs) 101a-101n may be utilized to perform cloud computing service applications 103a-103n. These cloud computing service applications 103 can utilize a communication network 105 to communicate to the CSP 107, for example a data storage service to control data storage and access at cloud.

The data center 107 can store user data and related information in a database 109 for offering storage services. The user data may include various data of a user, such as work documents, personal health records, privacy photos, study materials, etc. The user information may include user profiles. Further, the user information may additionally include one or more settings of the user regarding access control to the stored data (e.g., an access policy and a blacklist of ineligible users). In various embodiments, the data center 107 can be offered or operated by a cloud service provider for providing data storage in cloud side.

In view of the role in a storage service, entities in this system 100 can be classified into three types: a CSP which offers storage services via the data center 107 and database 109; a data owner which uploads and saves its data at the CSP by using its UE 101a; and one or more data holders, who are eligible data users for saving the same data as the data owner at the CSP, by using respective UEs 101b-n. Under the management of duplicated data according to embodiments of the present invention, the data holders are further allowed to access the data stored by the owner at cloud.

During a procedure of system setup, every data owner or holder, in short CSP user (denoted as u) maintains a public key PK_u, which is used by other users to generate personalized secret attribute keys for the user u, and a secret key SK_u, which is used in the decryption operation related to PK_u. Meanwhile, it also generates a key pair PK'_u and SK'_u for Public-Key Cryptosystem (PKC), e.g., signature generation and verification, as well as public key encryption and decryption. Generation of the above keys is a task of every user u. The keys SK_u and PK_u, SK'_u and PK'_u of a user u are bound to a unique identity of the user. the unique identity of the user may be a pseudonym of the user u. This binding is crucial for the verification of the user identity. At the procedure of system setup, PK_u and PK'_u can be certified by an authorized third party as Cert(PK_u), Cert(PK'_u). For example, the Cert(PK_u) and Cert(PK'_u) can be verified by the CSP, or a third party entity which may also be another CSP user.

As such, each user maintains a secret key SK_u that is used to generate and issue personalized secret attribute keys to other users based on respective identities of other users.

It is also used to generate its own public key of identity attribute of u, which is denoted as PK_(ID,u). The identity attribute can be represented as ID. It should be appreciated that the ID can be an anonymous identifier of a user u. For every attribute with representation (ID, u), there is a public key, denoted PK_(ID,u), which is generated by u and is used to encrypt the symmetric key DEK that is randomly selected for encrypting the data of u, aiming to control data access and deduplication. The corresponding personalized secret attribute keys for decrypting cipher-key encrypted by PK_(ID, u) are the personalized secret attribute keys personalized for respective eligible data holders and issued by the data owner u. To prevent collusion, every holder gets a different personalized secret attribute key that only it can use. A personalized secret attribute key of the attribute ID, issued for an eligible holder (denoted as u') by the data owner u is denoted as SK_(ID,u,u'). In the context of the disclosure, the set of secret keys that a user u' has (i.e., the key SK_u' and SK_(ID,u,u')) can be called as its key ring. Table 1 introduces main system keys involved in the schemes of the present invention.

TABLE 1

| Key | Description | Usage |
|---|---|---|
| PK_u | Public key of a user u for ABE | An unique ID of a user u, and a key for verification of the user attributes, evaluation of user ID and personalized secret attribute key generation for the user u. |
| SK_u | Secret key of a user u for ABE | Decryption (to get a personalized secret attribute key) |
| PK'_u | Public key of a user u for PKC | For PKC encryption, signature verification |
| SK'_u | Secret key of a user u for PKC | For PKC decryption, signature generation |
| DEK_u | Symmetric key of a user u | Encryption of data of a user u |
| PK_(ID, u) | Public key of attribute ID generated by a user u | Encryption of the symmetric key DEK_u |
| SK_(ID, u, u') | Secret key of attribute ID for another user u' issued by a user u | Decryption of the symmetric key DEK_u |
| DEK'_u | Renewed Symmetric key of a user u | Re-Encryption of data of a user u |

The management of data storage and access of various embodiments involves a number of fundamental algorithms, which can be referred to as InitiateNode, CreateIDPK, IssueIDSK, EncryptKey, Encrypt, DecryptKey and Decrypt. The description of these seven algorithms is as follows:

(1) InitiateNode(u):

The InitiateNode algorithm takes as input an identity ID of a user u, which is generally a unique identity of the user u or a unique identity of a UE of the user u. It outputs a number of user credentials and public user key PK_u, that is used to issue personalized secret attribute keys for the user u (e.g., by another data owner with respect to whom the user u acts as a data holder), and a secret user key SK_u, that is used for the decryption of ciphertext encrypted by PK_u. Meanwhile, it also generates another key pair PK'_u and SK'_u for Public-Key Cryptosystem (PKC), e.g., signature generation and verification and public key encryption and decryption. This process is conducted at the user u, such as UE 101a-n.

(2) CreateIDPK(ID, SK_u):

The CreateIDPK algorithm is executed by a user u (i.e., a data owner), whenever the user u would like to control its data storage and access by other data holders at the cloud. The algorithm may further check whether the ID of the user u satisfies policies related to management of the data. For example, it may check whether the ID is an eligible ID of a data owner for managing storage and access of a data. If the ID satisfies the policies, the algorithm outputs a public attribute key (denoted PK_(ID,u)) associated with the ID for the user u, according to an ABE mechanism. Otherwise, the algorithm can output NULL.

(3) IssueIDSK(ID, SK_u, PK_u):

The IssueIDSK algorithm is executed by a user u to generate personalized secret attribute keys personalized for other users u' according to an ABE mechanism. This process is executed based on an identity verification by checking Cert(PK_u') of a user u' is a valid identifier certified by a third trusted party or the data owner itself and that the user u' of PK_u' is a valid data holder. For example, prior to the generation of a secret attribute key personalized for a user u', the algorithm can check whether the user u' with a public key PK_u' is eligible, for example according to an attribute ID of the user u'. In other words, it checks whether the PK_u' is of an authorized party for holding the data. If this is the case, IssueIDSK outputs a personalized secret attribute key SK_(ID,u,u') for user u', with taking the public key PK_u' as an input. Otherwise, the algorithm can output NULL. The personalized secret attribute key SK_(ID,u,u') can be sent to the user u' by the user u, through a secure channel or using PKC.

(4) EncryptKey(DEK_u, A, PK_(ID,u)):

The EncryptKey algorithm is executed by a user u to encrypt its data encryption key DEK based on an ABE mechanism. The DEK is a key to be used for encrypting data stored at the cloud. The DEK can be a symmetric key selected by the user u. For example, in an instance that a data owner u allows other data holders with an ID (e.g. bound to PK_u') to share its data storage, the data owner u encrypts its data encryption key DEK according to an ABE scheme by using an identity of the user u and an access policy as attributes. The public key PK_(ID,u) of the user u can be used for the identity attribute in the ABE scheme.

For example, the access policy can be set by the data owner u for the data holder u' as (A1: ID=PK_u'). The access policy specifies conditions that should be satisfied by related attributes of eligible users. The policy can be described in Disjunctive Normal Form (DNF), which can be written as $$A = \bigvee_{j=1}^{n} \left( \bigwedge_{A_i \in S_j} A_i \right) \quad (1)$$

where Sj denotes the j-th access condition in an access policy, and n is the total number of S (n=1, 2, 3, . . . ). Ai denotes an attribute that occur in the j-th conjunction of A. S can be a set of attributes, and S1, S2, . . . , Sn are not pairwise disjoint.

According to embodiments of the invention, the n sets S1, S2, . . . , Sn denote attributes that occur in the j-th conjunction of A, by applying additional data access control conditions at the same time to support deduplication. Then, according to a ABE mechanism, the encryption key algorithm iterates over all j=1, . . . , n, generating for each conjunction a random value R_j and constructs CK_j corresponding to each Sj. The cipher-key CK is obtained as tuple CK:=<CK_1, CK_2, . . . , CK_n>.

Accordingly, when a user u would like to encrypt its DEK (denoted as DEK_u) for allowing merely other eligible users u' satisfying an access policy A to access data storage of the user u, the EncryptKey algorithm can be executed by the user u to take as input an encryption key DEK_u, the access policy A, and the public key PK_(ID,u) of the user u which corresponds to the identity attribute occurring in the access policy A. The algorithm encrypts DEK_u with the access policy A, and then outputs the cipher-key CK_u. This process is conducted at the user u to support deduplication of data storage at a CSP.

(5) DecryptKey(CK_u, A, SK_u SK_(ID,u,u')):

The DecryptKey algorithm is executed by a user u' to decrypt the cipher-key CK_u produced by the user u based on an ABE mechanism. This algorithm takes as input a cipher-key CK_u produced by the EncryptKey algorithm, an access policy A under which CK_u was encrypted, and a key ring (SK_u', SK_(ID,u,u') for a user u'. The algorithm DecryptKey decrypts the cipher-key CK_u, and then outputs the corresponding plain-key DEK_u if the attributes of the user u' are sufficient to satisfy the policy A; otherwise it outputs NULL. This process can be executed at the user u' if a duplicated storage happens. In some embodiments, the algorithm can firstly checks the access policy A, and then conducts decryption with the key rings to get DEK_u if the policy is satisfied.

(6) Encrypt(DEK_u, M):

The Encrypt algorithm takes as input the data M, the symmetric key DEK_u. The algorithm encrypts M with DEK_u, and then outputs the ciphertext CT. This process is conducted at user u to protect its data stored at a CSP with DEK_u.

(7) Decrypt(DEK_u, CT):

The Decrypt algorithm takes as input the encrypted data CT, the symmetric key DEK_u. The algorithm decrypts CT with DEK_u and outputs the plain data M. This process is conducted at a user u' or u to disclose the plain content of stored data at a CSP.

Figure 2:
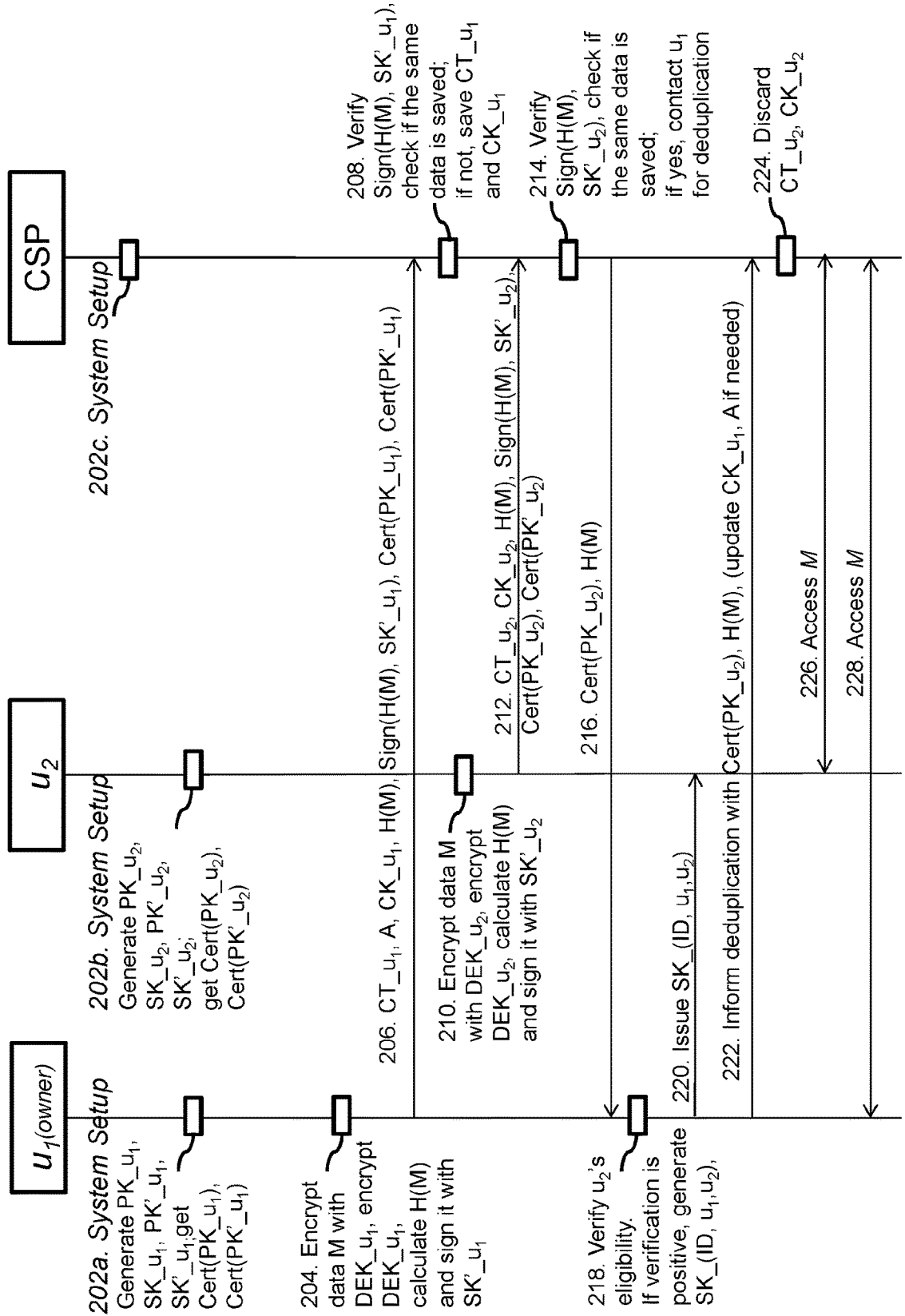
FIG. 2 is a flowchart of an overall system process for data deduplication in cloud computing according to an embodiment.

FIG. 2 illustrates the procedure of data deduplication at a CSP with the instruction and control of a real data owner according to an embodiment. The CSP is capable of providing a data storage service. It is supposed that a user u1 is a real data owner and saved its sensitive personal data M at the CSP with protection using a data encryption key DEK_$u_1$, while another user u2 is a data holder who tries to save the same data at the CSP.

At the beginning of a data storage service, each user comes into a system setup procedure. In this regard, each user of the CSP generates personal credentials and two key pairs (PK_$u_i$, SK_$u_i$) and (PK'_$u_i$, SK'_$u_i$), wherein i is used to index the users (i=1, 2, . . . ). Meanwhile, each user can get the certificate of its generated public keys Cert(PK_$u_i$) and Cert(PK'_$u_i$). In this example, the user u1 generates its keys PK_u1, SK_u1, PK'_u1, and SK'_u1, and its public keys PK_u1 and PK'_u1 are further certificated as Cert (PK_u1) and Cert(PK'_u1), at 202a. Similarly, the user u2 generates its keys PK_u2, SK_u2, PK'_u2, and SK'_u2, and its public keys PK_u2 and PK'_u2 are further certificated as Cert(PK_u2) and Cert(PK'_u2), at 202b. During the system setup procedure, the CSP may certificate the public keys of these users (such as u1 and u2), at 202c.

By virtue of the keys generated and certificated in the system setup procedure, each user can store data at the CSP in a secure way. In this regard, it is assumed that the user (denoted as u1) would like to save its data (denoted as M)

at the CSP, and then at 204, u1 encrypts the data M for privacy and security protection with a randomly selected symmetric key DEK_u1 to get a ciphertext of the data M (denoted as CT_u1), by calling an algorithm Encrypt (DEK_u1, M). Then, at 206, it encrypts DEK_u1 with a public key of identity attribute (denoted as PK(ID, u1)) of the user u1, by calling an algorithm EncryptKey(DEK_u1, A, PK_(ID, u1)) to get a cipherkey (denoted as CK_u1) of the DEK_u1. As described above, PK(ID, u1) is generated from the key SK_u1 according to a data policy of the user u1, by calling an algorithm CreateIDPK(ID, SK_u1). In some embodiments, the key PK_(ID,u1) can be generated in the system setup procedure. Furthermore, the user u1 can calculates a hash code of the data M as H(M), and further sign it with SK'_u1 as Sign(H(M), SK'_u1). The hash code H(M) can be utilized as an index of the data M in the data storage service among the users (such as u1 and u2) and the CSP. Then, at 206, u1 sends the ciphertext CT_u1 and the cipherkey CK_u1 to the CSP for storage of data M. The associated H(M) and Sign(H(M), SK'_u1) can also be sent to the CSP for identifying the data M. The access policy A for the data M can be public or can be sent to the CSP together with the CT_u1 and CK_u1. In some embodiments, the Cert(PK_u1) and Cert(PK'_u1) can also be sent to the CSP together with the CT_u1 and CK_u1. In other embodiments, the Cert(PK_u1) and Cert(PK'_u1) can be obtained by the CSP in the system setup procedure, for example during the certification of the public keys PK_u1 and PK'_u1 at CSP. This parameters, keys and data may be sent to the CSP via one data package denoted as DP1 containing the CT_u1, A, CK_u1, H(M), Sign(H(M), SK'_u1), Cert (PK_u1), Cert(PK'_u1).

After receiving the data package, the CSP may perform a duplication check on the storage of the encrypted data M (i.e. CT_u1), related keys and information, at 208. In this regard, the CSP can verify Cert(PK_u1) and Cert(PK'_u1), to check if the user u1 is eligible to store the data M. Further, the CSP checks if the same data has been saved, by verifying Sign(H(M), SK'_u1) and finding if there is the same H(M) in a storage record. If the check is negative, i.e. there is no same data stored at the cloud, the CSP save CT_u1, CK_u1 and H(M), as well as other related information such as Cert(PK_u1), Cert(PK'_u1), and A. If the check is positive and the pre-stored data is from the same user, the CSP informs the user u1 of this situation. If the same data is from a different user such as u2, the CSP may trigger a deduplacation procedure as illustrated in reference to FIG. 3, details of which will be described later.

After the storage of the encrypted data M by the user u1, there may occur a duplicated data upload by another user (denoted as u2). For example, the user u2 may save the same data M at the CSP following a procedure similar to steps 204 and 206. That is, the user u2 may encrypts, at 210, the same data M with a symmetric key DEK_u2 to get a ciphertext of the data M (denoted as CT_u2), by calling an algorithm Encrypt(DEK_u2, M). The DEK_u2 may be randomly selected by the u2, and thus is normally different from the DEK_u1. Accordingly, the ciphertext CT_u2 is different from the ciphertext CT_u1. However, the index associated with the data M, such as the hash code H(M) computed by the user u2 for the data M is the same as that computed by the user u1. The user u2 may also encrypt DEK_u2 with its public key of identity attribute (denoted as PK(ID, u2)), by calling an algorithm EncryptKey(DEK_u2, A, PK_(ID,u2)) to get a cipherkey (denoted as CK_u2) of the DEK_u2. Then, the user u2 may send the CT_u2 and CK_u2 to the CSP. The data index H(M) and its signature Sign(H(M), SK'_u2), and the public keys of the user u2 Cert(PK_u2), and Cert(PK'_u2) can also be sent the CSP, for example together with CT_u2 and CK_u2 in a data package DP2 as shown at 212.

After receiving the data package from the user u2, the CSP performs a duplication check as in step 214. Since the ciphertext CT_u1 of the same data has been saved by the user u1, the result will be positive. In this case, at 216, the CSP notifies the data owner u1 of the duplication of the data M. In this regard, the CSP may send H(M) and Cert(PK_u2) to the user u1 for deduplication.

In response to the receipt of the notification, the user u1 may firstly verify an eligibility of the user u2 for data holding and storage at a third party. For example, the eligiblity of the user u2 may be verified by checking an identifier of the user u2 or the Cert(PK_u2). If verification is positive, the user u1 generates a secret attribue key SK_(ID, u1,u2) by calling IssueIDSK(ID, SK_u1, PK_u2), at 218. Then, the user u1 can issue the secret attribue key to the user u2 (for example by using a secure channel or PKC) at 220, in order to allow the user u2 to access the data stored by the user u1 at the cloud. The user u1 further informs the CSP to deduplicate the same data stored by the user u2. As shown at 222, the user u1 may send to the CSP a notification containing the Cert(PK_u2) and the H(M).

After getting the notification for deduplication, the CSP discards the CT_u2 and CK_u2, and recordes corresponding deduplication information, such as a record about that the data M has ever been uploaded by the user u2 and that the user u2 is allowed to acces the data M stored by the user u1. At this moment, both the user u1 and the user u2 can access the same data M saved at the CSP freely, as illustrated at steps 228 and 226. In this regard, the user u1 can use the key DEK_u1 to decrypte the CT_u1 directly, while the user u2 can get to know the DEK_u1 by calling an algorithm DecryptKey(CK_u1, A, SK_u2, SK_(ID,u1,u2)) to decrypt the CK_u1, and in turn decrypte the CT_u1 with decrypted DEK_u1.

The procedure of data deduplication illustrated in FIG. 2 can be applied to multiple data deduplication. In this regard, a further user (denoted u3) may upload the same data M (in form of ciphertext denoted as CT_u3) to the CSP as the user u2, and then the user u1 may issue a personalized secret key SK_(ID, u1, u3) to the user u3 using the public key Cert (PK_u3) of u3 by calling an algorithm IssueIDSK(ID, SK_u1, PK_u3) and informs the CSP to deduplicate the data uploaded by the user u3. Similar to the deduplication for the data uploaded by the user u2, after getting this notification, the CSP discards CT_u3 and CK_u3 and recodes deduplication information corresponding to this data uploaded by the user u3. As such, the users u1, u2 and u3 are all able to access the same data M saved at the CSP freely. The user u1 can use DEK_u1 directly, while the users u2 and u3 can get to know the DEK_u1 by calling DecryptKey(CK_u1, A, SK_u2, SK_(ID,u1,u2)) and DecryptKey(CK_u1, A, SK_u3, SK_(ID,u1,u3)), respectively.

Embodiments of the invention can support a large number of duplication happened at the CSP. In this case, the data holder can only send an index of the data to be stored and the public keys of the data holder (e.g. in a form of DP={H(M), Sign(H(M), SK'_u2), Cert(PK_u2), Cert (PK'_u2)}) to the CSP for duplication check, before uploading the real data CT_u2. According to the index H(M), the CSP may determine if a duplication of the data associated with the H(M) happened, for example by checking if a storage of the same data has been existed at the cloud. If duplication happens, the CSP will inform the data owner to issue a personalized secret attribute key to the data holder u2. Meanwhile, the data holder u2 can only get a personalized secret attribute key SK_(ID, u1, u2) from the data owner, without uploading the real data (e.g. CT_u2) to the cloud.

According to various embodiments, the deduplication scheme can cooperate with other data access control mechanisms, by introducing control attributes (access policies) into the DEK encryption with ABE when calling EncryptKey(DEK_u, A, PK_(ID,u)). For example, both deduplication and access control can be supported by updating the access policy A. In this case, the encryption of the DEK_u1 is re-conducted in step 218 accordingly. The user u1 may further send the updated policy A' and an updated CK'_u1 which is computed with the updated policy A' to the CSP at 222. Then, a user (other than a data holder) allowed to access the data stored at the cloud, can be issued with a personalized secret attribute key, and use this key to decrypt the updated CK'_u1 to get the DEK_u1 and in turn get the raw data M from the ciphertext CT_u1. It should be appreciated that since the DEK_u1 does not change, data holders who have had the DEK_u1 can still use this key to decrypt the ciphertext CT_u1, without necessary of getting the updated CK'_u1. As such, users who have not held and uploaded a data M, can also be allowed to access the data M with a proper access management under the control of the data owner. This can greatly support a digital rights management based on the expectation of the data owner.

Trust and reputation can also be applied to control the data access over the cloud. Through using an ABE mechanism in the deduplication scheme, it is easy to build an access policy trees that contains attributes (e.g., trust level and identifier) used for data access. Thus, an access control based on trust and reputation can be easily integrated into the deduplication scheme.

Figure 3:
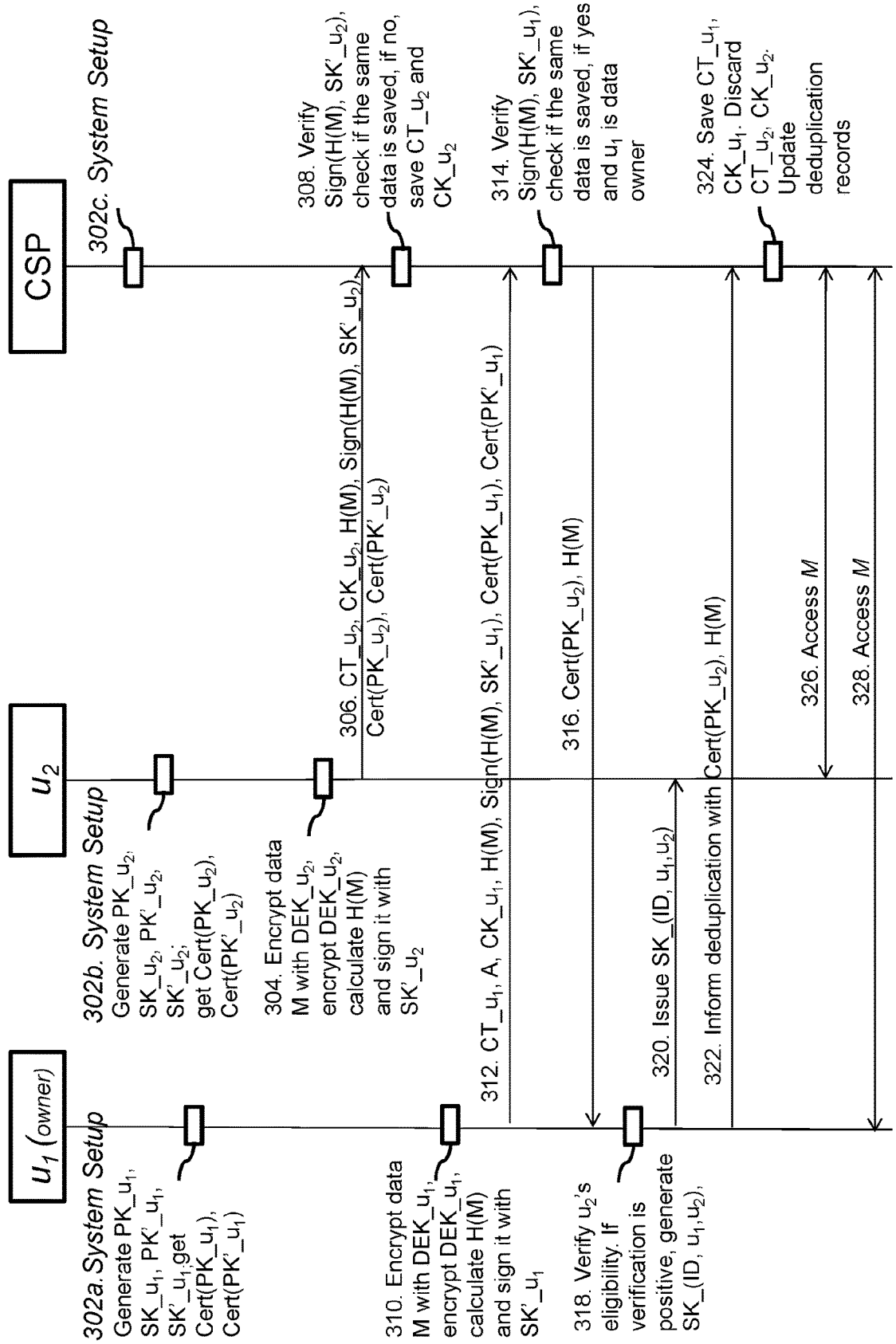
FIG. 3 is a flowchart of an overall system process for data deduplication in cloud computing according to another embodiment.

In case that the real data owner uploads the same data M later than the data holder, the CSP can manage to save the encrypted data uploaded by the real data owner at the cloud, and allow the data owner to manage and issue corresponding access keys to other data holders. This procedure is shown in FIG. 3. As shown in FIG. 3, the system setup procedure 302a, 302b, and 302c, are similar to those system setup procedure 202a, 202b, 202c in FIG. 2. The data storage procedure 304, 306 of the data holder u2 are similar as steps 210, 212 in FIG. 2, and the data storage procedure 310, 312 of the data owner u1 are similar as steps 204, 206 in FIG. 2, except that the user u2 uploads the encrypted data M CT_u2 at the CSP prior to the data owner u1.

Then, when the CSP performs a duplication check on the storage of the encrypted data M uploaded by the user u2 at 308 in a similar way as that in step 214, the result will be that there is no same data stored at the CSP. Then, the CSP may save the CT_u2 and related cipherkey CK_u2. Meanwhile, the other related information such as the Cert(PK_u2), Cert(PK'_u2), and H(M) can also be saved at the CSP. When the CSP performs a duplication check on the storage of the encrypted data M uploaded by the user u1 at 314 in a similar way as that in step 208, the CSP will find the pre-stored data from the user u2. Furthermore, the CSP can verify that the user u1 is a real data owner of the data M. Then, the CSP may trigger a deduplication procedure by sending H(M) and Cert(PK_u2) to the user u1 at 316. The deduplication procedure can be proceeded in a similar way as those illustrated in steps 218 to 224 in FIG. 2. In step 324, in addition to discarding the CT_u2 and CK_u2, the CSP can further save the CT_u1 and CK_u1 and update deduplication records accordingly. As such, both the user u1 and the user u2 can access the same data M saved at the CSP freely at steps 328 and 326 in a similar way as steps 228 and 226 shown in FIG. 2.

According to various embodiments, since only one copy of the same data is stored at the cloud that can be shared by both data owner and data holders, the storage space of the CSP can be saved obviously. Although storing deduplication records could occupy some storage or memory, this storage cost can be ignored in comparison with the big volume of duplicated data storage.

Figure 4:
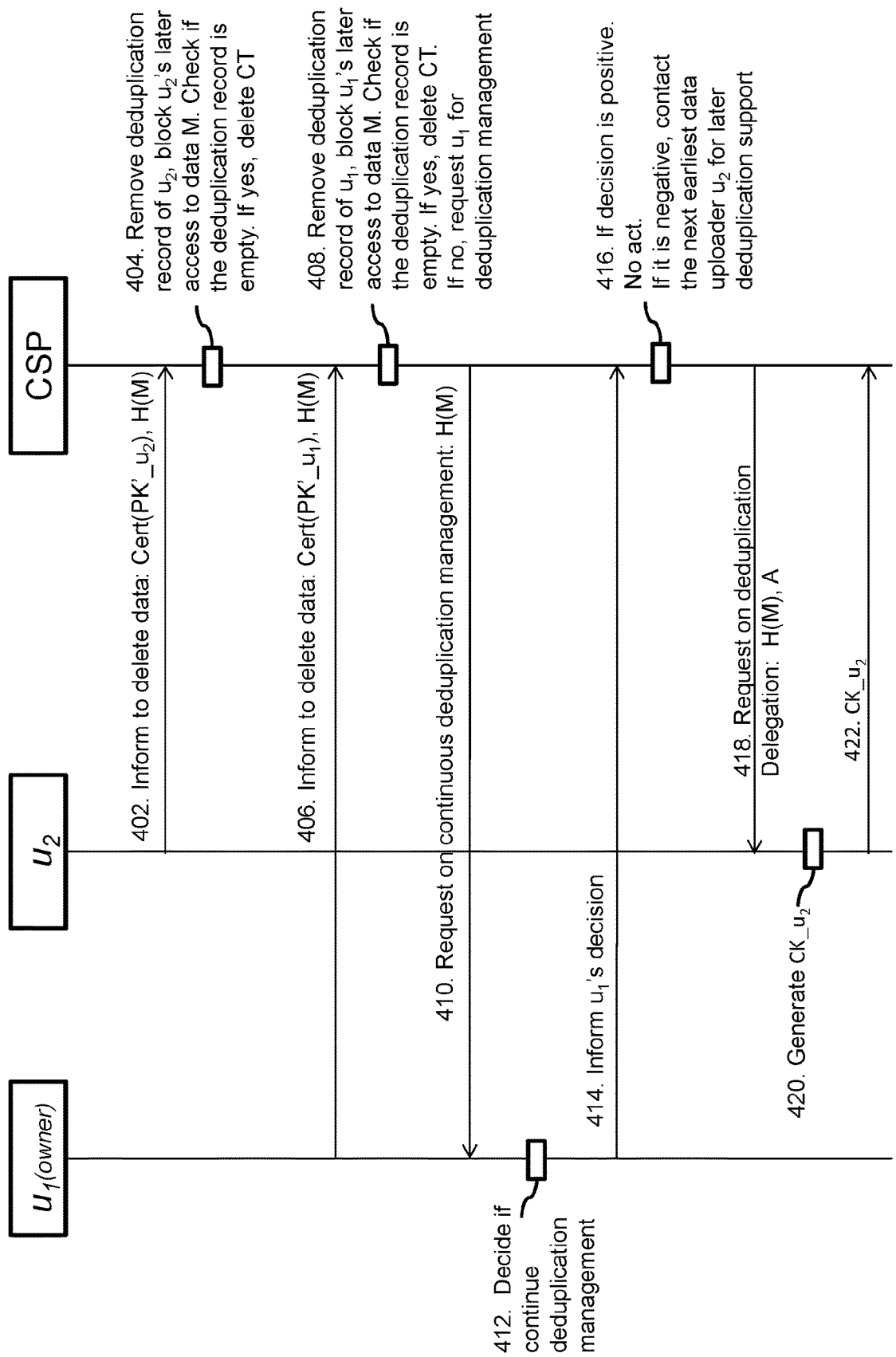
FIG. 4 is a flowchart of an overall system process for data deletion in cloud computing according to an embodiment.

FIG. 4 illustrates the procedure of data deletion by a data holder at CSP in the context of data deduplication. It also illustrates the procedure of data deletion by a data owner at CSP in the context of data deduplication. When a data holder u2 wants to delete the data from CSP, it sends a deletion request to the CSP. As shown at 402, the request may contain Cert(PK'_u2) and H(M). In response to the receipt of the deletion request, the CSP may check the validity of the request. If the request is valid, then at 404, the CSP removes deduplication record about the user u2, and then block the user u2's later access to data M. The CSP may further check whether the deduplication record about the data M is empty. If yes, it can delete the encrypted data CT of the data M and all related records.

When a data owner u1 wants to delete the data M from the CSP, it sends a deletion request to the CSP. As shown at 406, the request may contain Cert(PK'_u1) and H(M). In response to the receipt of the deletion request, the CSP checks the validity of the request. If the request is valid, then at 408, the CSP removes the deduplication record of u1, and block the user u1's later access to the data M at the cloud. The CSP may further check if the deduplication record about the data M is empty. If yes, it may delete the encrypted data CT of the data M and all related records. If not, the encrypted data CT of the data M and all related records are remained in the CSP, since CT is still valid for other users.

In this case, the CSP may further determine who will manage the storage and access of the remained data M. The CSP may request the data owner u1 for continuing a deduplication management for the data M, as shown at 410. The data owner u1 may inform its decision to the CSP, at 414. If the user u1's decision is positive, i.e. u1 decides to continue to manage the deduplication and access of the data, no action is needed to perform at the CSP. If the decision is negative, the CSP may select a data holder of the data as a manager for supporting the deduplication and access of the data. For example, a next earliest data uploader u2 may be contacted by sending a request on deduplication delegation. The request may contain a H(M) to identify the data M of which the deduplication and access are requested to be managed. The request may contain an access policy A, which may be specified by the data owner or other party. In this case, the user who accepts to serve as a delegate (e.g., u2) may encrypt the original data encryption key DEK_u1 with its own public key of identity attribute (such as PK_(ID, u2)), by calling EncryptKey(DEK_u1, A, PK_(ID,u2)) to get CK_u2, and then performs as a delegate of the data owner to support deduplication by sending the CK_u2 to the CSP.

In order to support a management of deduplication and access for data storage at cloud, the data owner or data holder who performs as a delegate of the data owner can update or change DEK and/or access policy A. Even during the procedure of data deletion, the CSP may also inform the data owner to allow the data owner to decide if a re-encryption of the raw data is needed. If so, the data owner can select a new DEK' and issue an updated encrypted DEK' to eligible data holders (e.g., through the CSP or directly using PKC).

Figure 5:
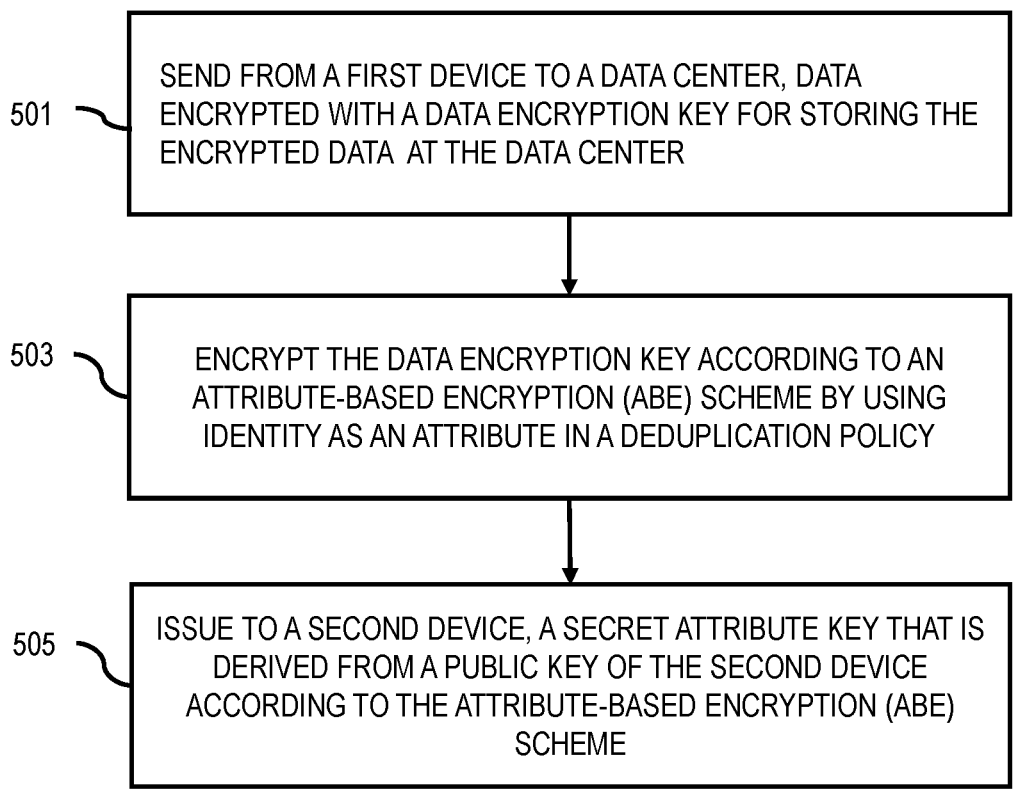
FIG. 5 is a flowchart of a process for managing a storage and access for duplicated data in cloud computing according to one embodiment.
Figure 7:
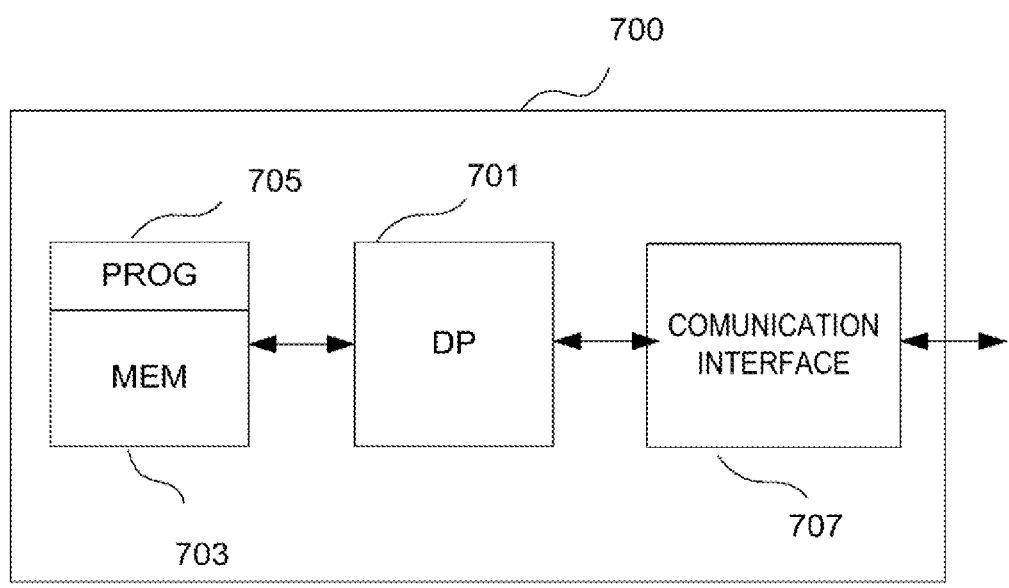
FIG. 7 is a simplified block diagram of various devices that are suitable for use in practicing the exemplary embodiments of the present invention.

FIG. 5 is a flowchart of a process for managing a storage and access for duplicated data in cloud computing according to one embodiment. In such an embodiment, the UEs 101 of one or more users of a storage service (such as the data owner u1 or the data holder u2 and u3 which acts as a deduplication delegate) performs the process 500 and is implemented in, for instance, a chip set including a processor and a memory as shown in FIG. 7. As such, the UEs 101 can provide means for accomplishing various parts of the process 500 as well as means for accomplishing other processes in conjunction with other components.

In step 501, UE 101 (such as UE 101a of a user u1) sends data (denoted as M) to a data center for storing the data at the data center. The data is in a security form by being encrypted with a data encryption key (such as DEK_u1). Next in step 503, the UE 101 encrypts the DEK_u1 according to an ABE scheme by using identity as an attribute in a deduplication policy for the data. The policy can be set by the UE 101, and can be public in the storage service or be shared among entities in the storage service. In some embodiments, the deduplication policy can specify policies for storage and/or access to the data. The identity of the UE 101 can be bounded to a public attribute key, which can be generated by calling an algorithm CreateIDPK(ID, SK_u). For example, the DEK_u1 can be encrypted by calling an algorithm EncryptKey(DEK_u1, A, PK(ID, u)) as discussed above. Then, in step 505, UE 101 issues to a device of a data holder (such as a user u2), a personalized secret attribute key specific to the data holder which is derived from a public key of the second device according to the attribute-based encryption (ABE) scheme. For example, a personalized secret attribute key for the user u2 can be generated by calling an algorithm IssueIDSK(ID, SK_u, PK_u') as discussed above. This personalized secret attribute key can be used for decrypting the encrypted DEK_u1 at the second device, in combination with the policy. For example, the encrypted DEK_u1 can be decrypted by the user u2, by calling an algorithm DecryptKey(CK_u, A, SK_u', SK_(ID, u, u')). In this example, the encrypted DEK_u1 can be sent from the user u1 to the user u2 directly in a secure way. Alternatively, the user u1 can send the encrypted DEK_u1 to the CSP, for example together with the uploaded data, and then the user u2 can retrieve the encrypted DEK_u1 from the CSP.

Figure 6:
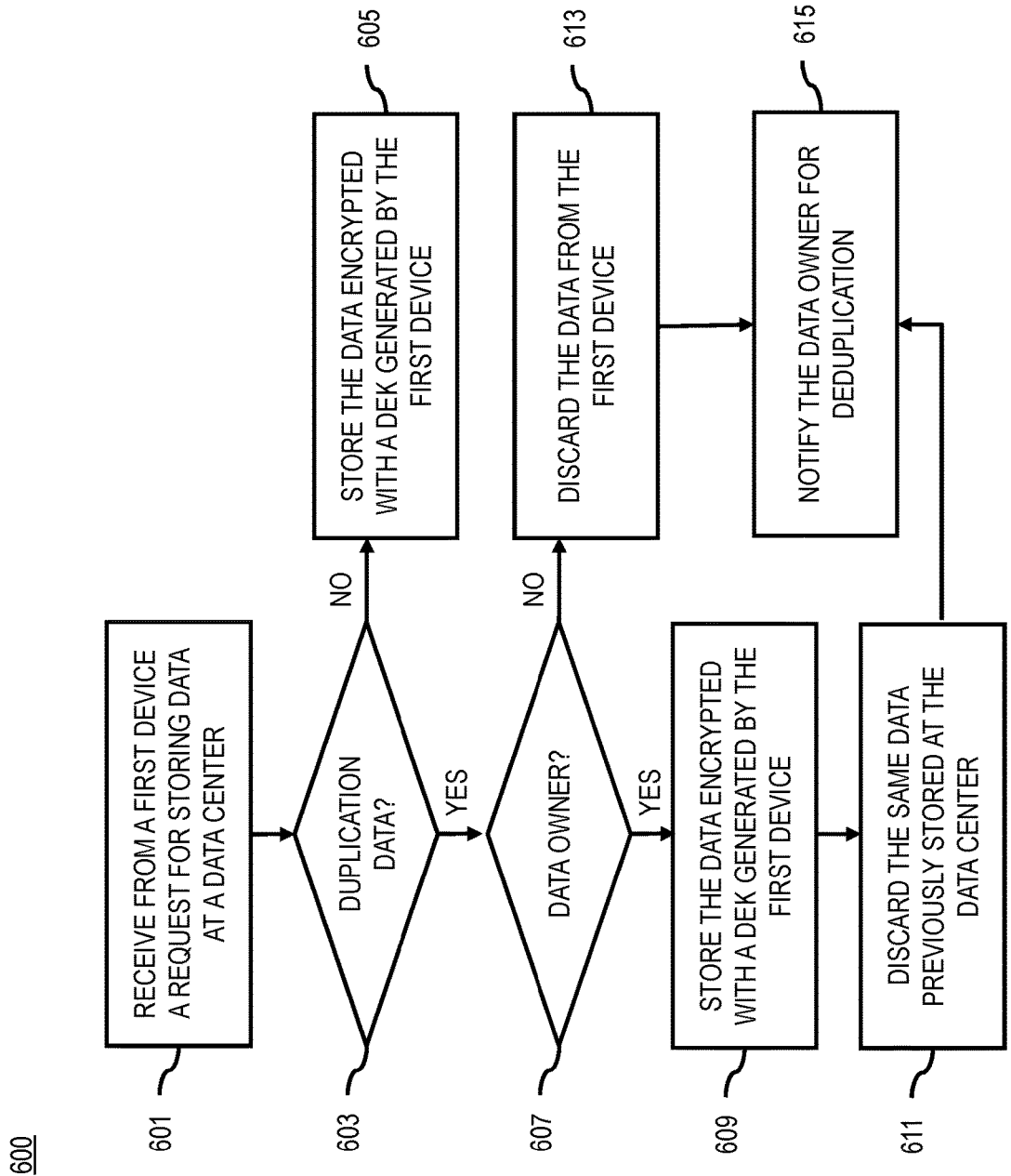
FIG. 6 is a flowchart of a process for managing a storage and access for duplicated data in cloud computing according to one embodiment.

FIG. 6 is a flowchart of a process for managing a storage and access for duplicated data in cloud computing according to one embodiment. In such an embodiment, the data center 107 (such as a CSP) performs the process 600 and is implemented in, for instance, a chip set including a processor and a memory as shown in FIG. 7. As such, the data center 107 can provide means for accomplishing various parts of the process 600 as well as means for accomplishing other processes in conjunction with other components.

In step 601, the data center receives from a first device (such as the UEs of the user u1, u2, or u3) at a request for storing data at the data center (e.g. in the database 109). Next in step 603, the data center checks if there is same data already stored at the data center. In response to a check result that there is no same data stored at the data center, the data center stores the data at the data center, wherein the data in a security form by being encrypted with a data encryption key (such as DEK_u1). In response to a check result that there is same data already stored at the data center, the data center notifies an owner of the data for deduplication. In this regard, the data center can further determine if the user of the first device is the owner. If the user of the first device is the owner, the data center can store the data. The data center can further discard the same data previously stored at the data center and notify the first device for deduplication by issuing a personalized secret attribute key for accessing the data to the user whose data storage is discarded.

Now reference is made to FIG. 7 illustrating a simplified block diagram of various electronic devices that are suitable for using in practicing the exemplary embodiments of the present invention. In FIG. 7, a device 700 (such as UE 101 and data center 107) is adapted for communications with communication devices in a cloud computing. A management of a storage and access for duplicated data can be executed by the device 700 according to the exemplary embodiments of the present invention as discussed above.

The device 700 includes a data processor (DP) 701, a memory (MEM) 703 that stores a program (PROG) 705, and a suitable communication interface 707 for communications with other communication devices in a cloud via one or more communication networks. In an exemplary embodiment, the communication interface 707 can be a suitable transceiver, such as radio frequency (RF) transceiver for bidirectional wireless communications via one or more antennas. The PROG 705 is assumed to include program instructions that, when executed by the DP 701, enable the device to operate in accordance with the exemplary embodiments of this invention, as discussed above. That is, the exemplary embodiments of this invention may be implemented at least in part by computer software executable by the DP 701, or by hardware, or by a combination of software and hardware. The basic structure and operation of the device 700 are known to one skilled in the art.

The MEM 703 may be of any type suitable to the local technical environment and may be implemented using any suitable data storage technology, such as semiconductor based memory devices, flash memory, magnetic memory devices and systems, optical memory devices and systems, fixed memory and removable memory. The DP 701 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

The invention claimed is:

1. An apparatus comprising:
   at least one processor; and
   at least one memory including computer program code, the at least one memory and the computer program code configured to, with the at least one processor, cause the apparatus to at least:
      send, to a data center, data encrypted with a data encryption key for storing the encrypted data at the data center;
      encrypt the data encryption key according to an attribute-based encryption scheme by using identity as an attribute in a deduplication policy for the data;
      receive, from the data center, a public key associated with a device, wherein the public key is received in response to the device sending, to the data center, a request to store a duplicate of the encrypted data; and
      issue, to the device, a personalized secret attribute key which is derived from the public key of the device according to the attribute-based encryption scheme, wherein the personalized secret attribute key is to be used for decrypting the encrypted data encryption key at the device, in combination with the deduplication policy.

2. An apparatus of claim 1, wherein the apparatus is further caused to at least:
   receive a deduplication notification from the data center, indicating that a duplication of the same data from the device is requested to be stored or has been stored at the data center, wherein the personalized secret attribute key is derived and issued in response to the receipt of the deduplication notification.

3. An apparatus of claim 2, wherein the apparatus is further caused to at least:
   inform the data center to deduplicate the same data from the device.

4. An apparatus of claim 1, wherein the apparatus is further caused to at least:
   send the encrypted data encryption key to the data center and/or the device.

5. An apparatus of claim 1, wherein the apparatus is further caused to at least:
   issue to another device, a personalized secret attribute key which is derived from a public key of the other device according to the attribute-based encryption scheme,
   wherein the personalized secret attribute key issued to the other device is to be used for decrypting the encrypted data encryption key at the other device, in combination with the deduplication policy.

6. An apparatus of claim 1, wherein the apparatus is further caused to at least:
   set an access policy for the access to the data and sending the access policy to the data center.

7. An apparatus of claim 1, wherein the apparatus is further caused to at least:
   send to the data center, a request for deleting the data from the data center; and
   continue a control of an encryption of the data encryption key and the issue of personalized secret attribute keys for decrypting the encrypted data encryption key.

8. An apparatus of claim 1, wherein the apparatus is further caused to at least:
   send to the data center a request for storing the data; and
   receive from the data center an indication that there is no same data stored at the data center, wherein the data encrypted with the data encryption key is sent to the data center in response to the receipt of the indication.

9. A method comprising:
   sending, by a first device and to a data center, data encrypted with a data encryption key for storing the encrypted data at the data center;
   encrypting, by the first device, the data encryption key according to an attribute-based encryption scheme by using identity as an attribute in a deduplication policy for the data;
   receiving, at the first device and from the data center, a public key associated with a second device, wherein the public key is received in response to the second device sending, to the data center, a request to store a duplicate of the encrypted data; and
   issuing, by the first device and to the second device, a personalized secret attribute key which is derived from the public key of the second device according to the attribute-based encryption scheme, wherein the personalized secret attribute key is to be used for decrypting the encrypted data encryption key at the device, in combination with the deduplication policy.

* * * * *

UNITED STATES PATENT AND TRADEMARK OFFICE
CERTIFICATE OF CORRECTION

| | | |
|---|---|---|
| PATENT NO. | : 10,764,037 B2 | Page 1 of 1 |
| APPLICATION NO. | : 15/536986 | |
| DATED | : September 1, 2020 | |
| INVENTOR(S) | : Zheng Yan | |

It is certified that error appears in the above-identified patent and that said Letters Patent is hereby corrected as shown below:

In the Claims

In Column 20, Line 57, in Claim 9 after "key at the" insert -- second --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*